2,753,345

SUBSTITUTED MERCAPTOBENZOIC ACIDS AND METHODS OF PREPARING THE SAME

William B. Wright, Jr., Plainfield, N. J., assignor to American Cyanamid Company, New York, N. Y., a corporation of Maine No Drawing. Application January 23, 1953, Serial No. 333,011

10 Claims. (Cl. 260—247.1)

This invention relates to new organic compounds. More particularly, it relates to amino and substituted-aminoalkylmercaptobenzoic acids, esters, amides and salts thereof, and methods of preparing the same.

In the past alkylmercapto and arylmercapto derivatives of benzoic acid have been described. Also, amino alcohol esters of oxybenzoic acids are known. However, amino and substituted-aminoalkylmercaptobenzoic acids, such as hereinafter disclosed, have heretofore never been described.

The new compounds of the present invention may be illustrated by the following structural formula:

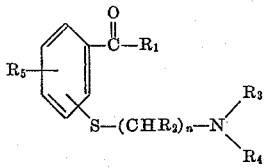

in which $R_1$ is an alkoxy, hydroxyl or amino radical, $R_2$ is hydrogen or a lower alkyl radical, $R_3$ and $R_4$ are hydrogen or alkyl radicals and together with the nitrogen atom, may constitute the atoms necessary to form a five or six membered heterocyclic ring, $R_5$ is hydrogen or a halogen atom and $n$ is a whole integer from 2 to 4.

The compounds of the present invention in the form of their salts are crystalline solids having a comparatively high melting point. The bases of these compounds, in general, are soluble in the common organic solvents such as acetone, ether, alcohol, benzene, etc., and many are water soluble. The salts are generally soluble in water and alcohol, insoluble in acetone, ether and benzene.

The preferred method of preparing the compounds of the present invention in the form of acids or esters is by reacting an amino or substituted amino alkyl halide with a thiosalicylic acid or ester thereof in a neutral or alkaline solution. In general, I prefer to carry out this reaction in an anhydrous inert solvent such as a lower aliphatic alcohol, acetone, or the like and isolate the product in the form of its hydrohalide salt. While the reaction can also be carried out under aqueous conditions, this method is less desirable and more complicated as the base, usually in the form of an oil, is obtained and must be separated by extraction and converted into a salt in order to obtain a crystalline compound. Having obtained the compound in crystalline form, it can be further purified by recrystallization from lower aliphatic alcohols or other inert solvents.

In carrying out the above reaction, a temperature of 20° C. to 80° C. can be used, however, I prefer to use refluxing temperatures which in the case of the lower aliphatic alcohols are between 65° C. and 80° C. At this temperature the reaction is usually complete within a period of from one-half to three hours. Temperatures in excess of 80° C. are usually to be avoided since they may cause decomposition of the desired product.

The esters can also be prepared by treating the acid with an alcohol under acidic conditions or by treating the acid chloride with an appropriate alcohol.

The amides of the compounds of the present invention are preferably prepared by adding an acid chloride to the appropriate amine at a temperature between 0° C. and 100° C. The amides can also be prepared by reacting an amino or substituted amino alkyl halide with the 2-mercaptobenzamide. However, this reaction is less desirable because of the difficulty of preparing and the instability of the 2-mercaptobenzamides.

Since the compounds of the present invention possess both amino and carboxylic acid groups, they are capable of forming various types of salts. For example, acid addition salts are prepared by reacting the free base with an acid such as hydrochloric, hydrobromic, sulfuric, and the like. Alkali metal salts are prepared by reacting the free base with alkali metal hydroxides, carbonates, etc. Quaternary ammonium salts are prepared by reacting the base compounds with alkyl halides such as methyl iodide, ethyl bromide, and the like. In the preparation of salts any inert solvent can be used, however, it has been found that good results are obtained by using a lower aliphatic alcohol and the product is easily isolated from these solvents. The reaction usually occurs rapidly at room temperature but in the case of the quaternary salts, the reaction is completed more rapidly if the reaction mixture is heated to a temperature of 65° C. to 80° C.

The compounds of the present invention affect the central nervous system and are active as anticonvulsants, antispasmodics, sedatives and analgesics. Also, some have activity as fungicides.

The following examples give in detail methods for preparing the compounds of the present invention. All parts are by weight unless otherwise indicated.

EXAMPLE 1

*Methyl ortho-(β-dimethylaminoethylmercapto)-benzoate.HCl*

A mixture of 34 parts of methyl thiosalicylate, 28.8 parts of β-dimethylaminoethyl chloride.HCl, 10.8 parts of sodium methylate and 200 parts by volume of methanol is stirred for two and one-half hours at room temperature and then refluxed for one-half hour. The reaction mixture is filtered hot to remove the salt and then concentrated under reduced pressure to a syrup. On addition of acetone a crystalline product separates. This is filtered, washed with acetone and ether and recrystallized from methanol. Methyl ortho-(β-dimethylaminoethylmercapto)benzoate.HCl melts at 151°–153° C. and is obtained in 55% yield.

EXAMPLE 2

*Methyl ortho-(β-diethylaminoethylmercapto)-benzoate.HCl*

A mixture of 16.8 parts of methyl thiosalicylate, 17.2 parts of β-diethylaminoethylchloride.HCl, 5.4 parts of sodium methylate and 100 parts by volume of methanol is stirred at room temperature for 75 minutes and then refluxed for 45 minutes. The reaction is filtered hot to remove the salt and then concentrated to a low volume. The precipitate is filtered and washed first with a little cold methanol and then with ether. On recrystallization from methanol, methyl ortho-(β-diethylaminoethylmercapto)benzote.HCl, melting at 150°–151° C. is obtained. Additional product can be recovered from the filtrates. Total yield of pure compound is 50–54%.

EXAMPLE 3

By essentially the same method as that described in Examples 1 and 2, the following compounds are also prepared:

(a) Methyl ortho-(β-morpholinylethylmercapto)benzoate.HCl, yield, 56%; melting point 180°–181° C.

(b) Methyl ortho-(β-piperidylethylmercapto)benzoate.HCl, yield 78%; melting point 203°–205° C.

(c) Methyl ortho-(α-methyl-β-piperidylethylmercapto)-benzoate.HCl, yield, 47%; melting point 166°–167° C.

(d) Methyl ortho-(α-methyl-β-dimethylaminoethylmercapto)benzoate.HCl, yield, 43%; melting point 152°–154° C.

(e) Methyl ortho-(γ-piperidylpropylmercapto)benzoate.HCl, yield 56%; melting point 152°–153° C.

(f) Methyl ortho-(β-pyrrolidylethylmercapto)benzoate.HCl, yield, 61%; melting point 174°–176° C.

(g) Methyl ortho-(β-aminoethylmercapto)benzoate.HCl, yield, 55%; melting point 153°–155° C.

EXAMPLE 4

*Ortho-(α-methyl-β-piperidylethylmercapto)benzoic acid.HCl*

A mixture of 30.8 parts of thiosalicylic acid, 39.6 parts of 1-piperidyl-2-chloropropane.HCl, 10.8 parts of sodium methylate, and 200 parts by volume of ethanol is refluxed for two hours and then filtered hot to remove the salt. The filtrate is concentrated under reduced pressure and a precipitate separates. This is filtered, washed with ethanol and recrystallized from ethanol. Ortho-(α-methyl-β-piperidylethylmercapto)benzoic acid.HCl; melting at 225°–226° C. is obtained.

EXAMPLE 5

Using the process described in Example 4, the following compounds are prepared:

(a) Ortho-(γ-piperidylpropylmercapto)benzoic acid.HCl, yield 47%; melting point 178°–180° C.

(b) Para-(γ-piperidylpropylmercapto)benzoic acid.HCl, yield, 59%; melting point 234°–236° C.

(c) Para-(β-morpholinylethylmercapto)benzoic acid.HCl, yield, 56%; melting point 197°–199° C.

(d) Ortho-(β-piperidylethylmercapto)benzoic acid.HCl, yield, 53%; melting point 183°–185° C.

(e) 5-Chloro-2-(α-methyl-β-piperidylethylmercapto)-benzoic acid.HCl, yield, 44%; melting point 206°–208° C.

(f) 5-Chloro-2-(β-piperidylethylmercapto)benzoic acid.HCl, yield, 60%; melting point 211°–212° C.

(g) Ortho-(β-pyrrolidylethylmercapto)benzoic acid.HCl, yield, 46%; melting point 170°–171° C.

EXAMPLE 6

*Methyl ortho-(β-dimethylaminoethylmercapto)benzoate methiodide*

A mixture of 5.52 parts of methyl ortho-(β-dimethylaminoethylmercapto)benzoate.HCl, 1.08 parts of sodium methylate and 20 parts by volume of methanol is filtered to remove salt and 3.4 parts of methyl iodide is added. The reaction is refluxed gently for two hours, cooled to room temperature and filtered. The precipitated methyl ortho-(β-dimethylaminoethylmercapto)benzoate methiodide is washed with methanol and dried. The yield is 88% and the melting point 187°–189° C.

EXAMPLE 7

Using essentially the same process as that described in Example 6 the following compounds are prepared:

(a) Methyl ortho-(β-piperidylethylmercapto)benzoate ethiodide, yield, 39%; melting point 208°–210° C.

(b) Methyl ortho-(β-diethylaminoethylmercapto)-benzoate ethiodide, yield 47%; melting point 183°–184° C.

(c) Methyl ortho-(β-diethylaminoethylmercapto)benzoate methiodide, yield 89%; melting point 183°–185° C.

EXAMPLE 8

*Para-(γ-piperidylpropylmercapto)benzamide*

One part of para-(γ-piperidylpropylmercapto)benzoic acid.HCl and one part by volume of thionyl chloride are allowed to stand at room temperature for one hour and then heated on the steam bath for one hour. The mixture is concentrated until it solidifies and then heated with ten parts by volume of concentrated ammonia. The product is filtered and purified by recrystallization from dilute alcohol. Para-(γ-piperidylpropylmercapto)-benzamide melts at 150°–151° C.

EXAMPLE 9

Using essentially the same process as described in Example 8 of reacting an acid chloride with the appropriate amine or alcohol, the following compounds are prepared:

(a) N-Benzyl para-(γ-piperidylpropylmercapto)benzamide; melting point 105°–106° C.

(b) Methyl para-(γ-piperidylpropylmercapto)benzoate.HCl; melting point 159°–161° C.

(c) Ethyl para-(γ-piperidylpropylmercapto)benzoate.HCl; melting point 126°–127° C.

(d) Butyl para-(γ-piperidylpropylmercapto)benzoate.HCl; melting point 127°–129° C.

I claim:

1. Compounds of the group consisting of those having the formula

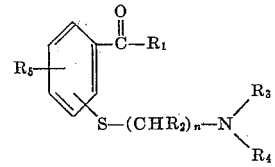

in which $R_1$ is a member of the group consisting of lower alkoxy, hydroxyl, amino and benzylamino radicals, $R_2$ is a member of the group consisting of hydrogen and methyl radicals, $R_3$ and $R_4$ are members of the group consisting of hydrogen and lower alkyl radicals and together with the nitrogen atom constitute a member of the group consisting of piperidyl, morpholinyl and pyrrolidyl radicals, $R_5$ is a member of the group consisting of hydrogen and chlorine radicals, $n$ is a whole integer from 2 to 3, and salts thereof.

2. Compounds of the group having the formula:

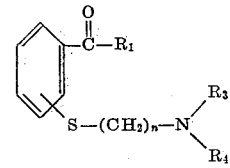

in which $R_1$ is a lower alkoxy radical, $R_3$ and $R_4$ are lower alkyl radicals and $n$ is a whole integer from 2 to 3.

3. Compounds having the formula:

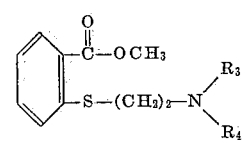

in which $R_3$ and $R_4$ are lower alkyl radicals.

4. Methyl ortho-(γ-piperidylpropylmercapto)benzoate.HCl.

5. Methyl ortho-(α-methyl-β-piperidylethylmercapto)-benzoate.HCl.

6. Ortho-(1-β-piperidylethylmercapto)benzoic acid.HCl.

7. Methyl ortho-(β-diethylaminoethylmercapto) benzoate methiodide.

8. Para-(γ-piperidylpropylmercapto)benzamide.

9. A method of preparing compounds having the formula

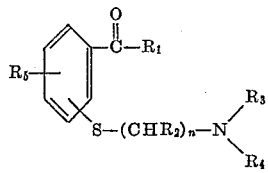

in which $R_1$ is a member of the group consisting of lower alkoxy, hydroxyl, amino and benzylamino radicals, $R_2$ is a member of the group consisting of hydrogen and methyl radicals, $R_3$ and $R_4$ are members of the group consisting of hydrogen and lower alkyl radicals and together with the nitrogen atom constitute a member of the group consisting of piperidyl, morpholinyl and pyrrolidyl radicals, $R_5$ is a member of the group consisting of hydrogen and chlorine radicals, $n$ is a whole integer from 2 to 3, which comprises reacting a compound having the formula

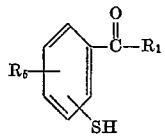

in which $R_1$ and $R_5$ are as defined above with a compound having the formula

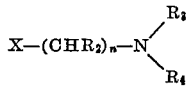

in which $R_2$, $R_3$, $R_4$ and $n$ are as defined above and $x$ is a halogen having an atomic number between 17 and 35, said reaction being carried out within the temperature range of 20° C to 80° C.

10. A method of preparing compounds having the formula

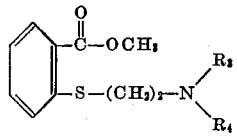

in which $R_3$ and $R_4$ are lower alkyl radicals which comprises reacting the methyl ester of thiosalicyclic acid with a β-diloweralkylaminoethyl chloride at a temperature within the range of 20° C.–80° C. and recovering said compound therefrom.

References Cited in the file of this patent
UNITED STATES PATENTS
2,669,564     Clinton _____ Feb. 16, 1954

OTHER REFERENCES
Fieser et al.: Org. Chem., page 32 (1944).